UNITED STATES PATENT OFFICE.

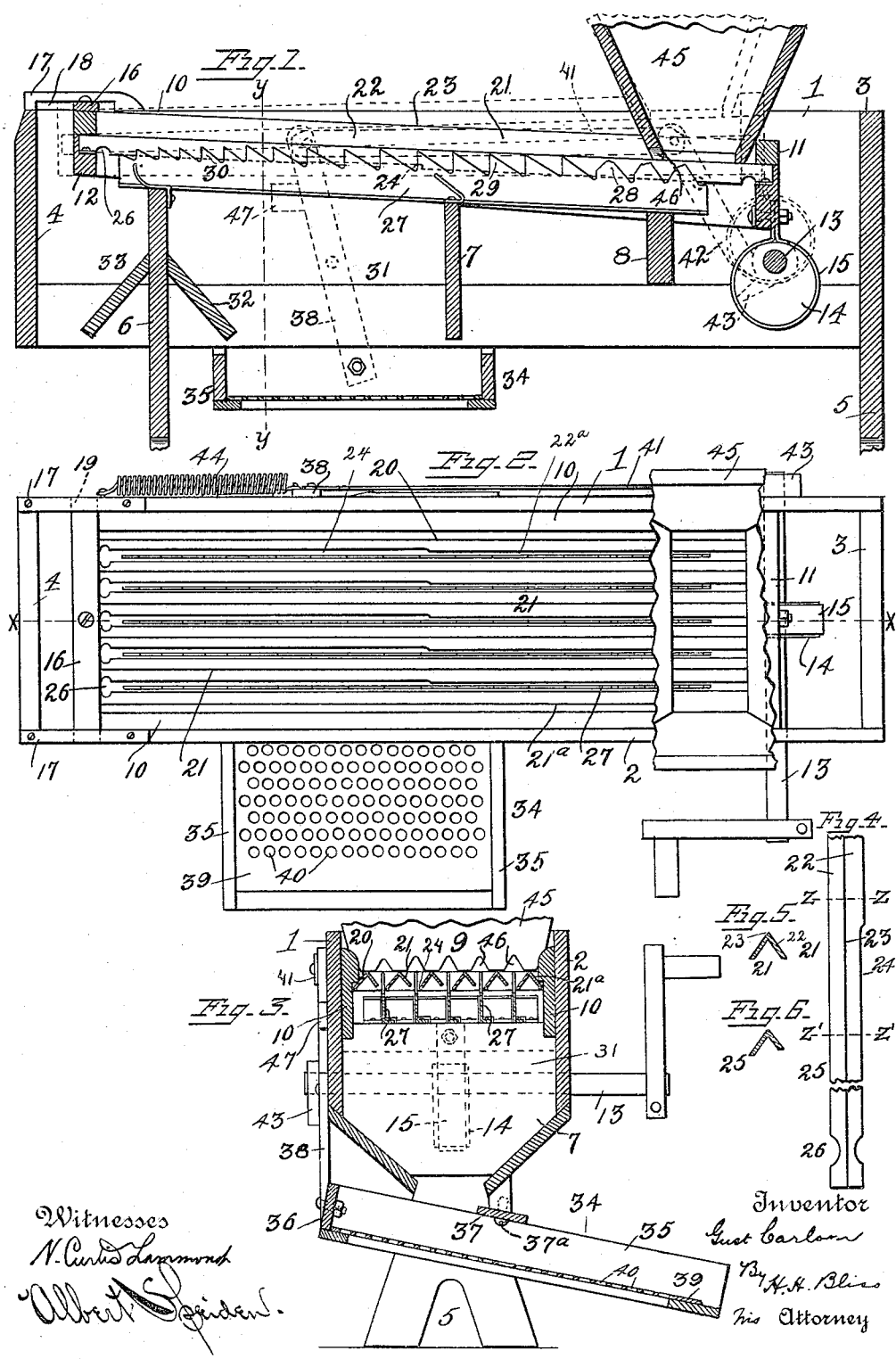

GUST CARLSON, OF MOLINE, ILLINOIS, ASSIGNOR TO DEERE & MANSUR COMPANY, OF MOLINE, ILLINOIS, A CORPORATION OF ILLINOIS.

GRAIN-ASSORTER.

1,163,889.           Specification of Letters Patent.           Patented Dec. 14, 1915.

Application filed April 14, 1906, Serial No. 311,644.    Renewed November 13, 1912. Serial No. 731,228.

*To all whom it may concern:*

Be it known that I, GUST CARLSON, a citizen of the United States, residing at Moline, in the county of Rock Island and State of Illinois, have invented certain new and useful Improvements in Grain-Assorters, of which the following is a specification, reference being had therein to the accompanying drawing.

This invention relates to improvements in mechanism for assorting grain kernels.

It is particularly well adapted, and, in fact, is primarily intended for the assorting of kernels of Indian corn supplied to it in a miscellaneous mass for the purpose of separating from such mass all the kernels having a certain predetermined thickness and not exceeding a predetermined width. As is well-known the most approved automatically acting corn planting mechanisms depend upon an accurate counting of the kernels which are dropped for each hill; this counting being accomplished by devices which receive edgewise all of the kernels of a certain thickness and size. It is desirable to initially supply to such planting mechanism masses of kernels which are equal to each other as concerns the dimensions upon which the planting mechanism depends for its proper action.

Figure 1 is a longitudinal vertical section on the line x—x of Fig. 2, showing an assorting mechanism embodying my improvements; Fig. 2 is a top plan view of the machine; Fig. 3 is a vertical transverse section on the line y—y of Fig. 1; Fig. 4 is a plan view of one of the longitudinal or screening bars detached; Fig. 5 is a cross-section of the same on the line z—z of Fig. 4; Fig. 6 is a cross-section on the line z'—z' of Fig. 4.

The mechanism illustrated in the drawings comprises a main framework and the movable operative parts mounted thereon. The frame has side bars or casing boards 1, 2, a head end board 3 and a foot end board 4. The end board 3 is shown extended downward, as indicated at 5, to provide a support from the floor or ground. At 6 there is another vertically arranged board or frame piece, the lower part of which can also be utilized as a floor support. In this framework there is mounted a longitudinally and vertically reciprocating frame comprising the longitudinal side boards or sills 10, 10, the cross bar 11 at the head end, and the cross bar 12 at the foot. The cross bar 11 is used to provide a vertical support for the receiving end or head end, it being connected to and carried by the power shaft 13 which is provided with an eccentric 14 and strap 15, which is secured to the ends of the vibrating frame. At the foot end this frame is supported vertically by means of projections 19 which are fitted in slideways, 18. These projections may be the ends of a cross-bar 16 secured to the top of the frame bar 12. To hold them in place use is made of guide cleats 17 having slots 18 in which are fitted and travel the projecting parts 19.

When the shaft 13 is rotated the eccentric 14 carried thereby will cause the head or upper end of the frame to rise and fall and also cause it to bodily reciprocate longitudinally of the main frame. This reciprocating frame has a series of longitudinally arranged parallel assorting or seed guiding bars 20, 21 and 21ª, the bar 20 being at the extremity of the series on one side of the machine and the bar 21ª being at the other extremity of the series at the other side of the machine. The intermediate bars 21 are each formed in the way shown in Figs. 4, 5 and 6, and each is made of a section of sheet metal bent into V-form, as shown in Figs. 5 and 6, so as to provide side faces 22 sloping comparatively sharply, and the crown or apex line 23. The bottom edges of each of these bars is distant from the bottom edges of the adjacent bars on each side so as to leave vertical passageways 22ª between them. These passageways extend for a suitable distance longitudinally of the bars 21, but each of these bars 21 is cut away for the remaining distance on one side along its lower edge, and this cut away part leaves wider vertical passageways 24. Kernels of grain can move either to the right or to the left along one face 22 or the other of each of these bars 21. The bar 20 at one side of the machine is made and shaped similarly to the bars 21, but one of its faces 22 is largely covered by the frame bar 10 so as to prevent the kernels of grain from slipping outward on the bar and compelling them to move inward toward the longitudinal center. The bar 21ª on the other side of the machine is not recessed or cut away, as will be seen on examining Fig. 2.

The effect of cutting away or recessing the bars is to make each wider at its receiving end and narrower, as at 25, at its foot or delivery end. Each of the bars 20, 21, 21ª, is provided with a relatively short but still wider recesses, at as 26, so that at points near the extreme end of the bars there are wide passage for kernels to drop. These bars 20, 21 and 21ª, being secured to and carried by the frame 10, 11 and 12, will vibrate vertically and reciprocate longitudinally therewith, as will be understood.

27, 27 indicate vertically arranged bars or plates which are stationary relatively to the main frame and secured thereto by resting upon and being fastened to the cross bars 6, 7 and 8. Each of these plates or bars 27 is provided with or has formed upon its upper edge a series of teeth 28, 29 and 30. These are of such shape that they will engage with kernels which are suspended by the bars 20, 21, and cause a step by step advance of such kernels. The toothed plates are in the vertical planes of the passageways 22ª and 24. The movable frame 10, 11, 12, as it descends, causes the protruding of the teeth 28, 29 and 30 through these apertures between the bars and during a part of the rotation of the shaft 13 they remain thus protruding and in engagement with the kernels of corn, and as the movable frame is drawn toward the head of the machine the teeth on the parts 27 cause a relative advance of the kernels along the frame.

The kernels which drop through the passages 24 are received in a hopper-like chamber 31 having, if necessary, a sloping wall 32, and are delivered to the screen 34. This has side bars 35, an end bar 36 and a cross bar 37. By the cross bar 37 the frame is pivoted at 37ª to the main frame and by the head bar 36 it is pivoted to a vibrating lever bar 38, which in turn is pivoted to the side board 1 of the machine. The frame thus just described supports a screen plate 39 having circular apertures as shown at 40. The bar 38 is connected by a link 41 to a second pivoted bar 42 situated near the shaft 13. 43 is a cam on this shaft and at each revolution of the latter the cam engages with the lever bar 42 and through the link 41 and lever 38 imparts a swinging movement to the sieve frame and sieve. As soon as the cam 43 escapes from the bar 42 the screen and the parts connected therewith are returned to their initial position by the spring 44.

The grain is initially supplied to the machine in a hopper 45, the front wall of which is notched or recessed at its lower edge as shown at 46.

The operation of the machine above described will be readily understood. If a mass of corn, for example, is supplied to the hopper and the shaft 13 put in motion, the assorting frame is subjected to a series of forward and backward movements, bodily, in relation to the main frame and the rear or receiving end is subjected to a series of rising and falling movements. These cause the kernels of corn to come out from the bottom of the hopper through the recesses 46 in a series of rows, each of these rows forming itself in one of the V-shaped cavities between an inclined face 22 on a bar 20 or 21 and the inclined face of the adjacent bar. The lateral dimension of the passages 22ª is such that they will permit the downward escape of only those kernels which are undesirably thin and the escape of small pieces, or the escape of broken particles of corn, and particles of foreign material. At each rotation of the shaft 13 and during part of the complete movement of the reciprocating structure the teeth on the bars 27 project through the passageways 22ª far enough to cause a step by step advance of the kernels along the bars 20, 21. The corn grains are lying each with one of its edges turned downward, but unable to pass downward between the bars. As soon as the kernels of each row reach the wider passageways at 24, those which are of the desired thickness will drop through said passageways into the hopper 31 and be caught on the screen 34. The longitudinal advancing of the kernels step by step is still being caused by the teeth of the bars 27, one movement being effected at each rotation of the shaft 13.

Those kernels which are too thick to escape downward through the passages 24 move onward step by step until they reach the wider passageways at 26. These kernels are the ones which are approximately spheroidal in form and require a passageway of longer cross dimensions.

The kernels which pass through that section of the assorter that lies above the hopper 31 require a still further assorting. The separation that occurs in the upper shaking frame depends upon differences in the thickness dimensions of the kernels. But those of equal thickness may be unequal in width and it is desirable to obtain a mass of kernels which shall be as uniform as possible both with respect to thickness and with respect to width.

As above described, the kernels which drop through the passages 24 are received by the shaking screen 34, and the apertures 40 in this have a diameter which is predetermined with relation to the widths of the kernels. Those of a width not exceeding that which is predetermined will drop through these apertures 40, while those which have a greater width will slide down the screen 34 over the apertures and finally escape at its lower edge. A sharp shake is given to this screen at each revolution of the shaft by the spring 44. When the cam 43 escapes from the lever bar 42 the spring quickly pulls the lever 38 back against a stop or an abutment 47, thus imparting to the screen 34 a snapping action which gives the screen a jar, setting the kernels in motion which are collected thereon and causing those which are sufficiently narrow to enter and drop through the apertures 40.

I have above described quite fully the details of the form of machine which I illustrate and which I at present prefer. But it will be understood that there are certain matters that are characteristic of the structure which can be embodied in other ways. The series of bars 20, 21, 21ª constitute a floor-like structure adapted to support the grain, and such part of the apparatus can be formed in ways other than that described. I prefer to employ separate bars instead of a continuous floor formed with one or more trough-like cavities or grooves because of the ease and economy of manufacture. It will be noted that in the floor-like structure which supports the grain there are one or more passages for the dropping of the kernels, each passageway having a narrower part and a wider part and it will be seen that above these passageways there are means for causing the kernels to move or slide edgewise downward.

It will be observed that the side walls of the grooves in the floor of the screen or shaking frame to which the grain is delivered are sharply inclined, and are arranged at such distance apart, and are of such height relative to the width of the openings in the bottoms of the grooves, that the seeds or kernels, which are thin, will be maintained in rows and vertically on edge. From this it follows that when a seed or kernel comes to that part of an opening that corresponds with the thickness of that particular kernel, it will be in position to freely drop through the opening. The stationary feed bars 27 operate both to lift the kernels within, and to advance them along, the grooves in the floor of the screen. This intermittent lifting of the seeds or kernels, and allowing of them to fall or move downward along the inclined walls constituting the sides of the grooves, repeatedly presents each seed to the opening in the bottom of the groove, thus precluding its assuming such a position that it will not pass through the slot-like opening even though the width of the latter be sufficiently great to permit the kernel to pass therethrough if properly presented.

I am aware that apparatus has been proposed for sorting or grading articles of approximately cylindrical shape, but differing in diameter, by causing them to pass over a supporting surface in which are formed parallel openings of increasing width from the feeding on toward the tail end of the screen. But no such apparatus of which I am aware has been adapted to grade or sort flat seeds, such as Indian corn kernels, and in none of them was there provision made for arranging and maintaining thin flat seeds on edge, nor for repeatedly presenting them edgewise toward a slot or narrow opening in the screen surface.

By having the kernel advancing mechanism, such as the toothed bars 27, supported stationarily I can use a number of fingers or teeth placed closely together so that they will have numerous points of engagement with the rows of kernels and more effectively advance the latter.

What I claim is:—

1. In an apparatus for assorting Indian corn kernels or similar flat seeds, the combination of a screen the supporting surface of which is formed with a series of longitudinal grooves having sharply inclined walls arranged close together, and with slots in the bottoms of said grooves, the slots being narrower toward the feeding on end and wider toward the tail end of the screen, a hopper arranged to deliver the seeds to the grooves in the screen, means for imparting to the screen longitudinal and vertical movements, and a series of bars with toothed upper edges, supported independently of the screen and extending upward through the said slots into the grooves, the said bars being arranged to repeatedly lift the seeds within the grooves, to present them in new positions to the slots and to advance them along the grooves, substantially as set forth.

2. In a mechanism for assorting grain kernels, the combination of a vertically and longitudinally reciprocating frame, a floor-like structure for holding the grain which moves with the frame, and having a series of vertical passageways, each passageway having a narrow and a wider part, kernel advancing means having fingers and means for varying the position relative to each other vertically, of the kernel advancing means and vertical passageways so that the teeth are alternately in engagement and out of engagement with the grain kernels supported on the floor like structure over the vertical passageways.

3. In a mechanism for assorting grain kernels the combination with the vertically and longitudinally reciprocating frame having a floor-like support for holding the grain with a series of vertical passageways, each passageway having a narrower part and a wider part, of a series of stationary serrated or toothed plates or bars supported independently of the reciprocating frame, the position relative to each other vertically of the floor like support and toothed plates being thereby variable so that the teeth are intermittently in the same horizontal plane as the vertical passageways and at other times in a horizontal plane below that in which are the said passageways at such other times.

4. In an apparatus for grading Indian corn kernels according to their relative thickness and also according to their circumferential size, the combination of a screen having vertical slots for the downward dropping of the seeds, the slots being of different widths in their different parts longitudinally, said screen being adapted to support the seeds with their edges downward, means for moving them while on edge over the slots, and means for grading as to circumferential size the kernels of the sizes that pass through the portions of the slots having certain widths, substantially as set forth.

5. In a grain assorting machine, the combination of a screen formed with longitudinal slots through which the corn is adapted to pass, of feeder bars, each of which is mounted in the vertical plane of one of the said slots respectively, and means for varying the position relative to each other, both in a direction perpendicular to their longitudinal lines and in the direction of their longitudinal lines, of the feeder bars and screen slots so that the feeder bars are successively, first below the bottom plane of the slots, then at least in part, above the bottom plane of the slots, then in a relatively advanced position longitudinally within the slots and then in the initial position, whereby the seeds are repeatedly lifted through the screen and allowed to fall thereupon and also moved along the screen.

6. In a machine for assorting corn kernels or similar flat seeds, the combination of a screen having at one end part narrow openings through which can pass small impurities and at the other end part wider slots through which can pass kernels having thicknesses not exceeding the width of the slots, means for supporting the screen at the second said end in a manner to prevent vertical movement, and means engaging the first said end of the screen for reciprocating it vertically, whereby there is relatively violent agitation at the first part to remove impurities and relatively less violent agitation at the other part to permit the kernels to enter the slots.

In testimony whereof I affix my signature, in presence of two witnesses.

GUST CARLSON.

Witnesses:
M. E. JOHNSON,
F. F. HATCHER.

Copies of this patent may be obtained for five cents each, by addressing the "Commissioner of Patents, Washington, D. C."